(12) United States Patent
Anjo et al.

(10) Patent No.: US 6,378,080 B1
(45) Date of Patent: Apr. 23, 2002

(54) CLOCK DISTRIBUTION CIRCUIT

(75) Inventors: Kenichiro Anjo; Masayuki Mizuno, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/472,843

(22) Filed: Dec. 28, 1999

(30) Foreign Application Priority Data

Jan. 7, 1999 (JP) .......................................... 11-002315

(51) Int. Cl.[7] .................................................. G06F 1/04
(52) U.S. Cl. ...................................... 713/500; 713/400
(58) Field of Search ............................... 713/400, 500, 713/503, 600

(56) References Cited

U.S. PATENT DOCUMENTS

| | | | | |
|---|---|---|---|---|
| 4,703,288 A | * | 10/1987 | Frye et al. | ....................... 333/1 |
| 5,732,249 A | * | 3/1998 | Masuda et al. | .............. 713/503 |
| 5,944,836 A | * | 8/1999 | Edahiro | ....................... 713/503 |
| 6,052,012 A | * | 4/2000 | Camerlo | ...................... 327/292 |
| 6,208,702 B1 | * | 3/2001 | Ghoshal | ....................... 375/354 |

FOREIGN PATENT DOCUMENTS

| | | |
|---|---|---|
| JP | 10-293781 | 11/1988 |
| JP | 5-121548 | 5/1993 |
| JP | 5-233092 | 9/1993 |
| JP | 6-021225 | 1/1994 |
| JP | 6-244282 | 9/1994 |
| JP | 6-282350 | 10/1994 |
| JP | 6-325130 | 11/1994 |
| JP | 7-253825 | 10/1995 |
| JP | 8-221473 | 8/1996 |
| JP | 9-181187 | 7/1997 |
| JP | 9-307069 | 11/1997 |
| JP | 10-092939 | 4/1998 |
| JP | 10-135337 | 5/1998 |
| JP | 10-209287 | 8/1998 |
| JP | 10-223765 | 8/1998 |
| JP | 10-246754 | 9/1998 |
| JP | 11-003941 | 1/1999 |

OTHER PUBLICATIONS

Deutsch, et al., "Modeling and characterization of long on–chip interconnections for high–performance microprocessors", IBM Journal of Research and Development, vol. 39, No. 5, Sep. 1995, pp. 547–566.

Young, et al., "SA 20.1: A 0.35 um CMOS 3–880MHz PLL N/2 Clock Multiplier and Distribution Network with Low Jitter for Microprocessors", IEEE International Solid–State Circuits Conference, Feb. 8, 1997, pp. 330–333.

Sakurai, T., "Closed–Form Expressions for Interconnection Delay, Coupling, and Crosstalk in VLSI's", IEEE Transactions on Electron Devices, vol. 40, No. 1, Jan. 1993, pp. 118–124.

* cited by examiner

*Primary Examiner*—Dennis M. Bulter
(74) *Attorney, Agent, or Firm*—McGinn & Gibb, PLLC

(57) ABSTRACT

A clock distribution circuit is provided with a plurality of blocks each having a plurality of circuits, a first clock driver which distributes a clock signal to each of the blocks, and second clock drivers each provided in one of the blocks. Each second clock drivers distributes the clock signal to each of the circuits in the block. A first wiring is connected between the first clock driver and each of the second clock drivers so that the clock signal arrives at each of the second clock drivers in the same phase. A plurality of second wirings are connected between the second clock drivers and each of the circuits in the block. The second wirings may consist of transmission lines. The second wirings have a maximum length equal to or smaller than a product of clock skew allowable and a propagation velocity of an electromagnetic wave propagating through the second wirings.

12 Claims, 7 Drawing Sheets

CLOCK DISTRIBUTION CIRCUIT

BACKGROUND OF THE INVENTION

1. Field of the Invention

The present invention relates to a clock distribution circuit for use in semiconductor integrated circuits and the like, and more particularly to a clock distribution circuit with reduced clock skew.

2. Description of the Related Art

Recently, large-scale integrated circuits (LSIs) have increased rapidly in clock frequency, and the fastest ones have reached a frequency as high as 1 GHz. An increase in clock frequency can immediately improve the performance of LSIs since clock synchronous circuits are the most common in LSI design at present. Thus, increasing clock frequency is a technique of great significance. LSIs in use for conventional computers and the like have various configurations which have been proposed for distributing a clock to clock reference terminals with reduced phase differences thereamong. Those in common use are, for example, clock distribution circuits of tree structure and clock distribution circuits of mesh type. Clock distribution circuits of tree structure are described in Japanese Patent Application Laid-Open Nos. Hei 5-233092 and Hei 9-307069. Clock distribution circuits of mesh type are disclosed in Japanese Patent Application Laid-Open No. Hei 6-244282.

FIG. 1 is a circuit diagram showing a conventional clock distribution circuit of tree structure. The conventional tree-structured clock distribution circuit has an LSI chip 702 provided with an input terminal 701 through which a clock signal is input. The input terminal 701 is connected with inverters 703 through 705 in series. The inverter 705 in turn is connected with clock distribution wirings 712L and 712R having the same length and the same width. The clock distribution wiring 712R is connected with inverters 706a and 706b at its end. The clock distribution wiring 712L is connected with inverters 706c and 706d at its end. The inverters 706a–706d in turn are provided with wirings having the same length and the same width, being connected with a plurality of inverters 707a and 708a–708d, inverters 707b and 710a–710d, inverters 707c and 709a–709d, and inverters 707d and 711a–711d, respectively.

In the conventional clock distribution circuit configured thus, each wiring is formed in the same length and the same width which reduces the clock skew of the clocks arriving at the ends. A plurality of isometric wirings are also used from the buffers at the ends of the tree to a plurality of terminals for clock reference to reduce the clock skew. The clock distribution circuit described in Japanese Patent Application Laid-Open No. Hei 5-233092 mentioned above is of such configuration.

Meanwhile, the conventional clock distribution circuit described in Japanese Patent Application Laid-Open No. Hei 9-307069 mentioned above includes delay buffers to adjust the wiring delay at each node of the clock tree. Such configuration puts each stage of the clock tree into the same phase.

FIG. 2 is a circuit diagram showing a conventional clock distribution circuit of mesh type. The conventional mesh-type clock distribution circuit has an LSI chip 802 which is defined into a plurality of blocks 801. Each of the blocks 801 contains wirings 806 in the form of cross-meshes. The chip 802 is further provided with a buffer 804 for distributing a clock signal to the plurality of blocks 801 as a clock driver. In addition, clock distribution wirings 803 having the same length and the same width are provided from the buffer 804 to each of the blocks 801.

In the conventional clock distribution circuit configured thus, the use of mesh-form wirings produces smaller wiring resistances since the resistances can be regarded as parallel resistances. This allows the clock signals on lattice points to vary in voltage with a timing difference as small as negligible. The clock distribution circuit described in Japanese Patent Application Laid-Open No. Hei 6-244282 mentioned above is of such configuration.

Other types of clock distribution circuits include those described in Japanese Patent Application Laid-Open No. Hei 6-282350, which have LSIs containing a plurality of intra-block distribution circuits that utilize phase locked loops (PLLs), delay locked loops (DLLs), or the like having variable delay adjusters and phase comparators.

In the conventional clock distribution circuit described in the publication, the PLLS, DLLS, or the like always make comparisons and adjustments on mutual phases, so as to supply clocks in phase through clock reference terminals. According to this circuit, clocks can be distributed to the ends in phase even in the cases where the clock distribution wirings differ from each other in capacitance.

There have also been disclosed clock distribution circuits in which frequency multipliers using a variable delay adjuster are placed on the node portions of the clock tree (Japanese Patent Application Laid-Open No. Hei 7-253825). In the conventional clock distribution circuits, an external clock is multiplied inside to produce a higher clock.

These clock distribution circuits have been designed on the assumption that each clock wiring has a resistance component and a capacitance component. In this connection, a clock distribution circuit designed should be verified whether or not it satisfies the allowable value of clock skew, using a circuit modeling technique in which the rising time of a clock is obtained from the product of the load capacitance and the resistance component of the wiring. If the allowable value is satisfied, then the design is realized into circuitry.

"IBM Journal of Research and Development vol. 39, No.5" 9 (1995), pp.547–566, describes, however, the following points on microprocessors operating at a frequency of 300 MHz. That is, for a 1-cm-length wiring, the propagation delay time of the wiring is 130 through 370 pico-seconds; the rising time of propagated signals ranges from 100 to 900 pico-seconds; and the propagation delay time is not negligible with respect to the rising and falling times of the signals. It also reads that under these circumstances wirings must not be considered as RC distributed constant circuits in consideration of capacitance components and resistance components alone, but as transmission lines which further takes inductance into account.

Meantime, the clock distribution circuits described in the above-cited publications were designed in terms of RC distributed constant circuits. This produces a problem with high-frequency operations.

For example, the conventional clock distribution circuits described in Japanese Patent Application Laid-Open Nos. Hei 5-233092 and Hei 6-244282 are all under the assumption that the propagation characteristics of signals will be determined only by resistance components and capacitance components. This precludes the proper operation of the circuits on the condition that the rising time of the clock approaches the signal propagation time of the signal lines and that their inductance components are not negligible. In the cases where the rising time of the clock is e.g. 10% the clock frequency, inductance becomes not negligible at frequencies above 300 MHz since the propagation time of the signal lines is in the range of 130 and 370 pico-seconds for each 1-cm wiring.

Moreover, the circuits described in Japanese Patent Application Laid-Open No. Hei 6-282350 with PLLs, DLLs or the like using variable delay adjusters and phase comparators become extremely hard to construct at frequencies e.g. above 1 GHz. For example, "IEEE International Solid-State Circuits Conference" 2 (1997), pp.330–331, describes a technique in which a PLL itself has a jitter of 154 picoseconds. When the PLL is mounted on an LSI, the jitter even increases because of uncertain factors such as source noise. The aforesaid literature, pp.332–333, describes another technique in which a DLL itself has a jitter as small as 68 pico-seconds; however, the jitter increases up to 400 picoseconds when source noise of 1 MHz is applied. As seen above, the PLLs and DLLs are so strongly affected by electrical, uncertain factors such as source noise that they cannot be maintained below approximately 100 picoseconds in jitter when mounted on an LSI. Consequently, the clock distribution circuits which carry out phase adjustment by using PLLs and DLLs and whose clock skew allowable is not greater than about 10% of the clock frequency will fail to distribute clocks when the clock frequency exceeds 1 GHz.

Moreover, the conventional clock distribution circuits described above have been designed as RC distributed constant circuits, and therefore are susceptible to device production variations. The effect of the device production variations extends to transistors generating variations in their output resistances (ON-state currents). This may be regarded as a phenomenon resulting from a change in the supply voltage to the same transistors. That is, in a line between two inverters, the device variation characteristics of the clock skew can be represented by the amount of the difference in signal's propagation delay time produced by a change in the supply voltage to the transistor. The literature "IEEE Transactions on Electron Devices, pp.118–124, January, 1993" describes an equation to obtain a propagation delay time Tpd in an RC distributed constant circuit, which is shown in the equation (1) as follows:

$$Tpd=0.38 \times R_{int} \times C_{int} \times L^2 + 0.69 \times (R_{tr} \times C_{int} \times L + R_{int} \times C_L \times L + R_{tr} \times C_L) \quad (1)$$

Here, $R_{int}$ is the resistance of the wiring per unit length, $C_{int}$ is the capacitance of the wiring per unit length, $C_L$ is the load capacitance of the wiring, and $R_{tr}$ is the output resistance of the buffer.

The equation (1) to obtain a propagation delay time Tpd contains the output resistance Rtr of the transistor. This shows that the propagation delay time of the wiring designed as an RC distributed constant circuit depends on the device variations of the transistor. Accordingly, clock distribution circuits designed thus have a problem of causing variations in clock skew.

Furthermore, Japanese Patent Application Laid-Open No. Hei 9-51207 discloses microstrip transmission line substrates which can control wiring length to reduce a difference in absolute delay time. Application of such conventional transmission line substrates to clock distribution circuits, however, cannot efficiently suppress clock skew in high-frequency clock signals.

SUMMARY OF THE INVENTION

In view of the foregoing, an object of the present invention is to provide a clock distribution circuit which can distribute clock signals, particularly high-frequency clock signals, with smaller clock skew.

According to one aspect of the present invention, a clock distribution circuit comprises a plurality of blocks each having a plurality of circuits, a first clock driver which distributes a clock signal to each of the blocks, and second clock drivers each provided in one of the blocks. Each of second clock drivers distributes the clock signal to each of the circuits in the block. A first wiring is connected between the first clock driver and each of the second clock drivers so that the clock signal arrives at each of the second clock drivers in the same phase. A plurality of second wirings are connected between the second clock drivers and each of the circuits in the block. The second wirings may consist of transmission lines. The second wirings have a maximum length equal to or smaller than a product of clock skew allowable and a propagation velocity of an electromagnetic wave propagating through the second wirings.

According to another aspect of the present invention, a clock distribution circuit comprises a plurality of blocks each having a plurality of circuits, a plurality of first clock drivers each of which supplies a clock signal to each of the blocks, and second clock drivers each provided in one of the blocks. Each of second clock drivers distributes the clock signal to each of the circuits in the block. A plurality of first wirings are connected between the first clock driver and the second clock driver in each of said blocks so that the clock signal arrives at the second clock drivers in the same phase. A plurality of second wirings are connected between the second clock drivers and each of the circuits in the block. The second wirings may consist of transmission lines. The second wirings have a maximum length equal to or smaller than a product of clock skew allowable and a propagation velocity of an electromagnetic wave propagating through the second wirings.

In the present invention, the second wirings may consist of transmission lines whose maximum length is appropriately defined. This reduces clock skew to allow accurate distribution of clock signals at higher frequencies, and reduces the effect of device variations as well.

In other words, the wiring structure is decided in consideration of the effect of clock skew and inductance, so that high-frequency clock signals can be distributed to each circuit with smaller clock skew. In the conventional clock distribution circuits, variations in wiring delay time depend on the output resistances of transistors and the wiring resistances to cause the high susceptibility to device variations. In contract, the present invention uses transmission lines for the intra-block wirings, so as to be less subject to device variations of LSIs. The reason for this is that: the conventional circuits are affected by device variations in both wiring delay time and buffer delay time; meanwhile, in the present invention, the variations in wiring delay time are determined only by the propagation velocity of electromagnetic waves and the wiring length, which can eliminate the dependence on the performance of driven transistors to allow exclusive influence of the buffer delay time among the device variations.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Figure 1:
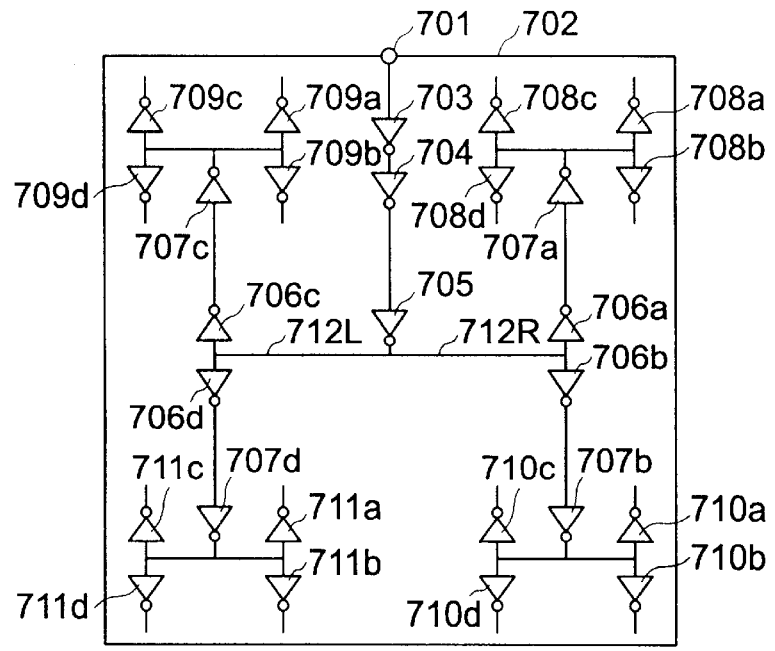
FIG. 1 is a circuit diagram showing a conventional clock distribution circuit of tree structure.
Figure 2:
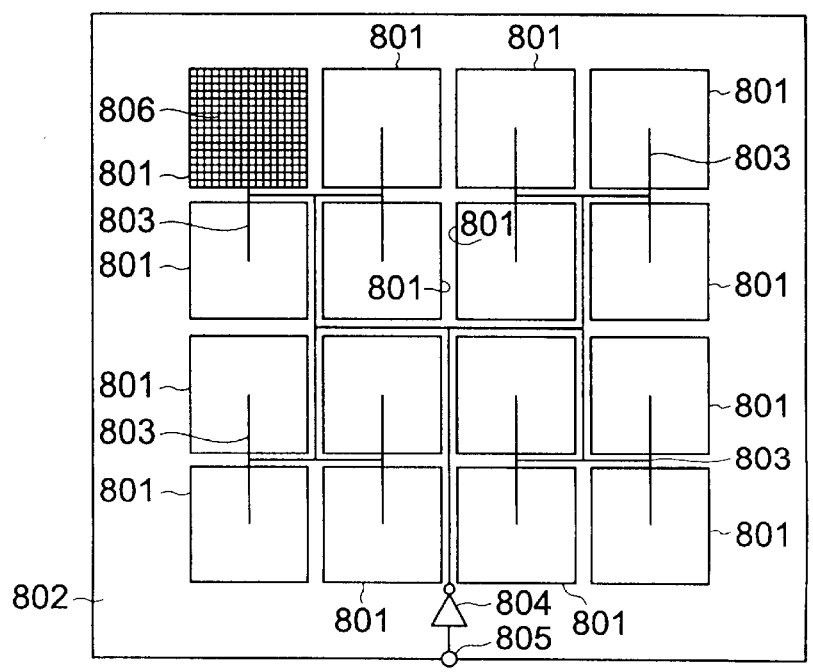
FIG. 2 is a circuit diagram showing a conventional clock distribution circuit of mesh type.
Figure 3:
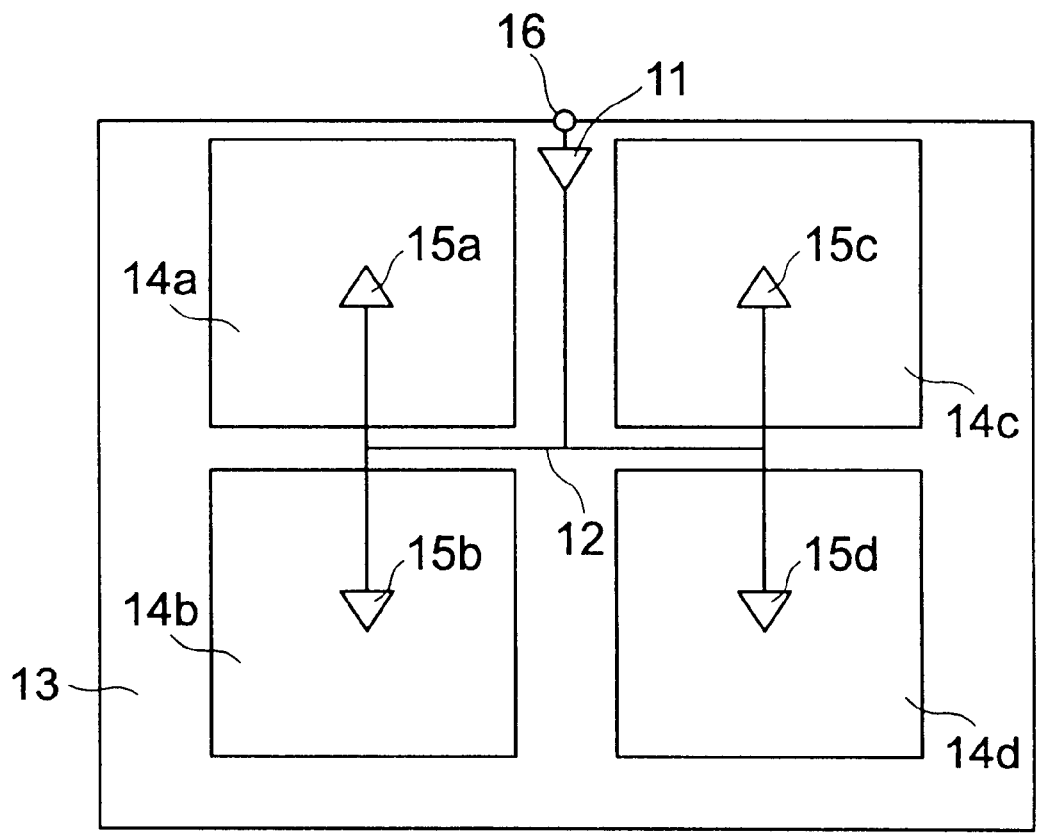
FIG. 3 a schematic diagram showing the clock distribution circuit according to a first embodiment of the present invention FIG. 4 schematic diagram showing the configuration a local block.

Hereinafter, concrete descriptions will be given of the clock distribution circuits according to the embodiments of the present invention with reference to the accompanying drawings. FIG. 3 is a schematic diagram showing the clock distribution circuit according to a first embodiment of the present invention.

In the first embodiment, a semiconductor chip 13 is provided with a plurality of circuit terminals for clock reference, and the circuit terminals are grouped into a plurality of blocks 14a through 14d. The blocks 14a–14d are provided with clock buffers 15a–15d at their centers, respectively. The clock buffers 15a–15d each serves as a second clock driver for driving a local clock in the block.

The semiconductor chip 13 is also provided with a clock input terminal 16 through which a clock signal is input. The clock input terminal 16 is connected with a clock buffer 11 which serves as a first clock driver. The clock buffer 11 in turn is connected with a global clock wiring 12 consisting of transmission lines. The global clock wiring 12 branches out three times with each end portion thereof connected to one of the clock buffers 15a–15d. Here, the length of the wiring from the buffer 11 to each of the clock buffers 15a, 15b, 15c, and 15d is identical. This results in clocks arriving at all the clock buffers 15a–15d in phase.

Figure 4:
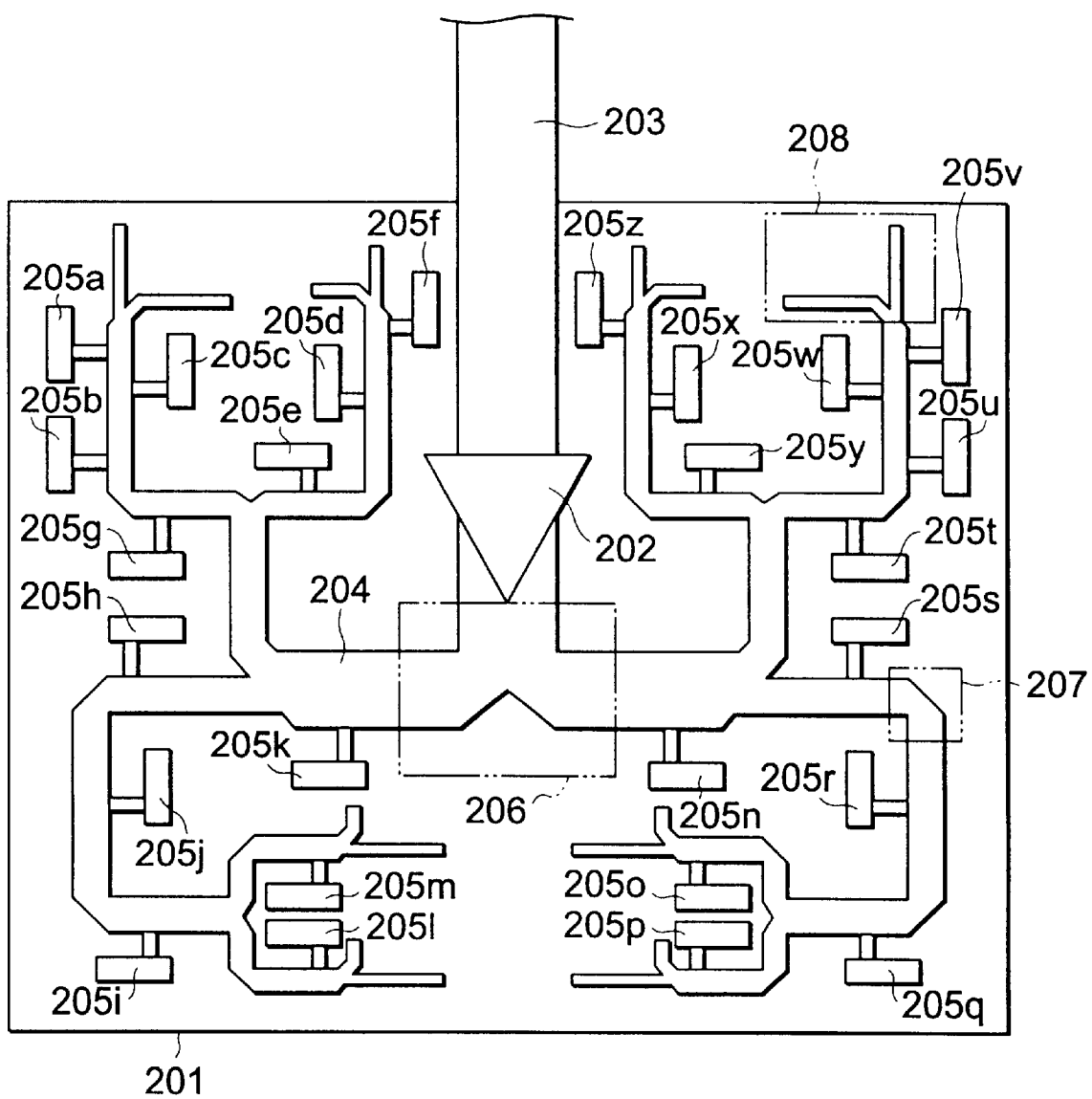

FIG. 4 is a schematic diagram showing the configuration of a local block. A local block 201 corresponds to each of the block 14a–14d shown in FIG. 3. The block 201 is provided with a clock buffer 202 as a local clock driver (the second clock driver) which is connected to a global clock wiring 203. The clock buffer 202 corresponds to each of the clock buffers 15a–15d in FIG. 3. The clock buffer 202 is also connected with a local clock wiring 204 consisting of transmission lines. Here, the local clock wiring 204 is provided with bend portions such as a bend portion 207, and branch portions such as a branch portion 206. The end portions of the local clock wiring 204 have no special terminators attached thereto, and are formed narrower than other regions as seen in an end region 208. The local clock wiring 204 is connected with clock reference terminals 205a–205z at different positions thereof.

Figure 5:
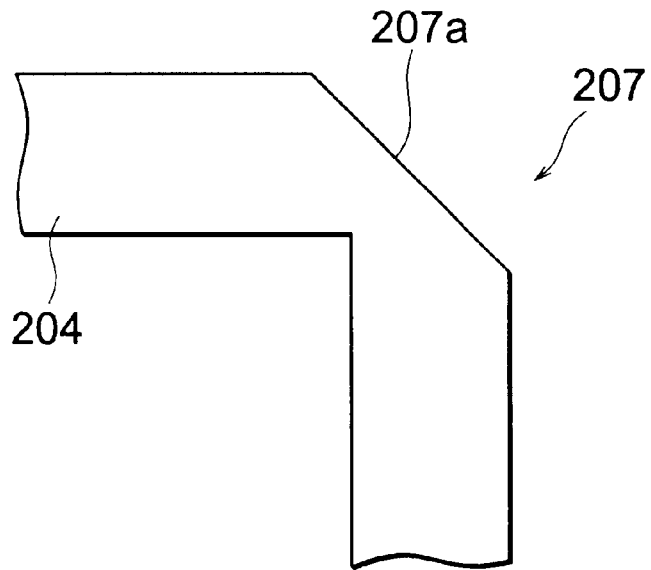
FIG. 5 is a schematic diagram showing a bend portion 207 of a local clock wiring 204.

FIG. 5 is a schematic diagram showing the bend portion 207 of the local clock wiring 204.

At the bend portion 207, the local clock wring 204 is bent at a right angle with its outer corner cut off into a beveled portion 207a. Such shape reduces the loss resulting from reflected waves. In this regard, the bend portion 207 is one of the bend portions formed on the local clock wiring 204; similar beveled portions are also applied to the other bend portions of the local clock wiring 204 and bend portions of the global clock wiring 12.

Figure 6:
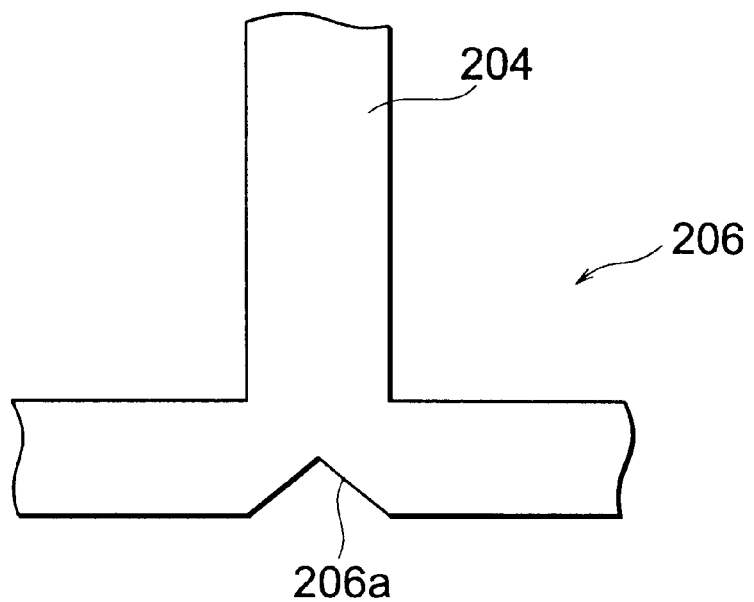
FIG. 6 is a schematic diagram showing a branch portion 206 of the local clock wiring 204.

FIG. 6 is a schematic diagram showing the branch portion 206 of the local clock wiring 204. At the branch portion 206, the local clock wiring 204 branches out so as to have a notch 206a formed therein. Such shape reduces the loss resulting from reflected waves. In this regard, the branch portion 206 is one of the branch portions formed on the local clock wiring 204; similar notches are also applied to the other branch portions of the local clock wiring 204 and branch portions of the global clock wiring 12.

The local clock wiring 204 has the maximum length equal to or smaller than the product of the clock skew allowable inside the semiconductor chip and the propagation velocity of electromagnetic waves propagating through the local clock wiring. For example, an allowable clock skew of 50 pico-seconds and an electromagnetic wave velocity of 0.149 mm/pico-seconds make a 7.45-mm maximum length of the local clock wiring 204. The clock skew allowable may be e.g. 10% the clock.

Moreover, in this embodiment, the local clock wiring 204 is formed to be smaller in width each time it passes a branch portion such as the branch portion 206 to reach an end. The wiring 204 may be finally narrowed to the extent that it can be approximated to RC distributed constant circuits. Moreover, the endmost terminals among those clock-referring terminals of the local clock wiring 204 are arranged so that high levels of the clock can be referred at a voltage at least higher than a threshold voltage thereof. The voltage Vd at an end portion is expressed in the following equation (2):

$$Vd = \exp(-R_{int} \times D/2Z_0) \quad (2)$$

Here, $R_{int}$ is the per-unit-length resistance of the local clock wiring 204, D is the length of the local clock wiring 204, and $Z_0$ is the characteristic impedance of the local clock wiring 204.

Unless the voltage Vd in this equation (2) exceeds the transistor's threshold, the end portion can be approximated to an RC distributed constant circuit, so that the width of the wiring is determined from the present value of $R_{int}$ and height of the wiring.

In the first embodiment configured thus, a clock signal input through the clock input terminal 16 is distributed by the clock buffer 11 to each of the clock buffers 15a–15d through the global clock wiring 12 consisting of transmission lines. Here, the clock signals arrive at the clock buffers 15a–15d in phase because the length of the wiring from the buffer 11 to each of the clock buffers 15a–15d is identical.

The clock signals distributed to the clock buffers 15a–15d are then distributed by the clock buffers 15a–15d to the clock reference terminals provided in the blocks 14a–14d, respectively. It should be noted that the local clock wiring 204 in the present embodiment is formed to be smaller in width each time it passes a branch portion, which provides a match in characteristic impedance across each branch portion. If the wiring were not narrowed in width by branch, mismatches would tend to occur in characteristic impedance across branch portions to reflected signals. This might preclude correct propagation of the signals.

In addition, in the embodiment, the gradual reduction of the wiring width increases the wiring resistances in proportion as approaching the ends. The wiring is finally narrowed to the extent that the approximation to RC distributed constant circuits is possible. This avoids reflection of signals at the line ends, preventing disorder in wave shape. As a result, the local clock wiring 204, which is connected with the terminals for clock reference at arbitrary positions on the track thereof, can supply clocks at a stable voltage from all the positions. Preventing the line-end reflection typically requires the lines to be terminated with terminators. However, when terminators are provided at the end portions of the lines, a current flows through the terminators all the time to increase power consumption. In contrast, the lines in the present embodiment are not terminated as described above, which is suitable for power consumption reduction.

In the first embodiment, the clock buffers 15a–15d are arranged at the centers of the blocks 14a–14d, respectively; however, their locations are not limited to the centers of blocks.

Besides, wirings that are provided so that the clock reference terminals 205a–205z for referring local clocks can make reference to a clock from the local clock wiring 204 may also be increased in resistance at the end portions thereof to the extent approximation to an RC distribution constant circuit is possible there. Such setting of the wiring resistance avoids the reflection at the ends of the wirings which are extended for the purpose of clock reference.

Moreover, the global clock wiring 12 between buffers may have a length approximately equal to an integer multiple of a fourth the clock wavelength. For example, when the clock frequency is 4 GHz, the wiring length may be as short as the minimum of 9.33 mm. In the wiring of such length, incident waves and reflected waves of the clock should interfere with each other to produce standing waves. Since voltage levels for the circuit terminals to refer are only those at the ends of the local clock wirings, it does not matter whether or not standing waves are produced by reflection to cause uneven voltage levels in the middle of the wirings, inasmuch as the voltage levels at the ends are stable. Accordingly, so long as the clock buffers provide a match between the output impedance and the characteristic impedance of the wirings so as not to produce standing waves at the input terminal, there is no need for special terminators for preventing reflection of signals at the output terminals. In other words, preventing disorder in voltage level at the output terminals only requires a match between the characteristic impedance at the input terminal and the output impedance of the driving buffer. In such case, reflections at the input terminal are eliminated, and thereby disturbance to signals at the output terminals is avoided.

Figure 7:
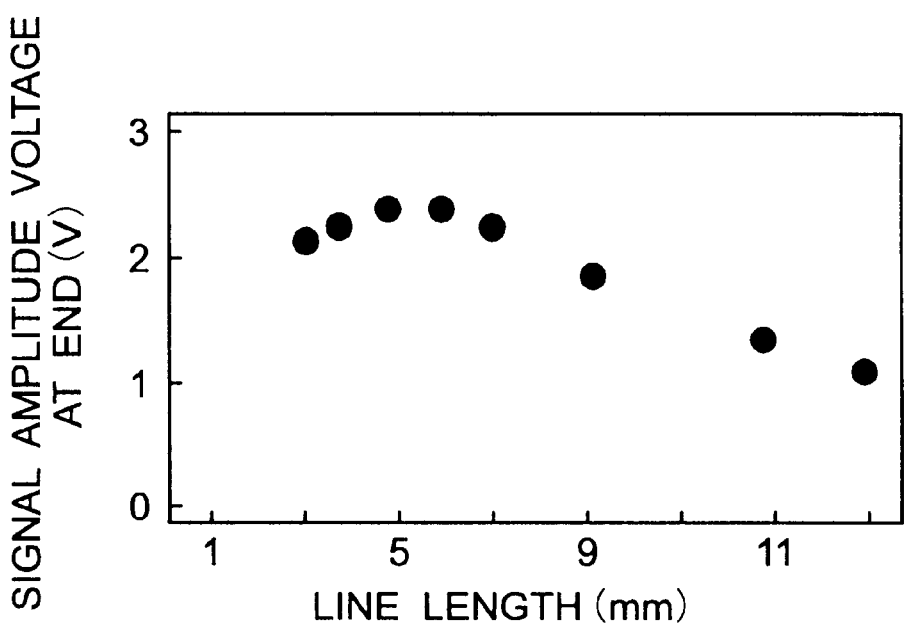
FIG. 7 is a graphic representation showing the relation between the line length and the signal amplitude voltage at an end.

Now, at the output terminals, reflected waves and traveling waves are synthesized to double the signal amplitude. This offers an effect of reducing the rise time to half. FIG. 7 is a graphic representation on which the abscissa represents the line length and the ordinate represents the signal amplitude voltage at an end, showing the relation between them. FIG. 7 was obtained under such a condition that microstrip transmission lines having a height of 1.6 $\mu$m, a width of 100 $\mu$m, an interlayer thickness of 2 $\mu$m, and a specific resistance of 238 $\Omega$/m were used to establish connection between inverters consisting of transistors with P channels of 1518 $\mu$m in width and N channels of 828 $\mu$m in width, each of the channels having a length of 0.1 $\mu$m. The clock frequency was set to 5 GHz. A quarter wavelength of the frequency of 5 GHz corresponds to about 7 mm. As shown in FIG. 7, the signal amplitude voltage at the end peaked over a line length on the order of 7 mm under the influence of standing waves. It should be note that the voltage peaked, in fact, on a line length somewhat smaller than 7 mm. This was due to the influence of the loss in voltage resulting from the elongated line.

Figure 8:
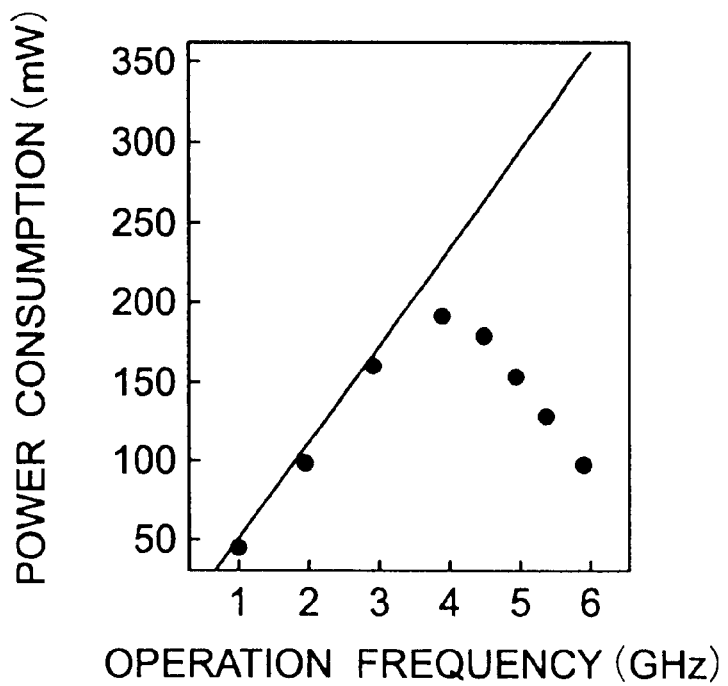
FIG. 8 is a graphic representation showing the relation between the operation frequency and the power consumption.

The standing-wave-utilizing wiring also produces an effect that the interference lowers the voltages in the middle of the wiring to reduce power consumption as compared to the case without the utilization of standing waves. FIG. 8 is a graphic representation on which the abscissa represents the operation frequency and the ordinate represents the power consumption, showing the relation between them. FIG. 8 was obtained in such a case that transmission lines were used to establish connection between inverters consisting of transistors with P channels of 1518 $\mu$m in width and N channels of 828 $\mu$m in width, each of the channels having a length of 0.1 $\mu$m. The transmission lines were 4 $\Omega$ in characteristic impedance, 238 $\Omega$/m in specific resistance, and 7mm in length which corresponds to a quarter wavelength of 5 GHz. The dots plotted in FIG. 8 represent the values of power consumption obtained when a circuit configured as described above was subjected to a simulation by a simulation program with integrated circuit emphasis (SPICE). The line in FIG. 8 is an ideal line which represents the power consumption without the effect of standing waves. As in FIG. 8, the simulation shows that the clock distribution circuit was reduced by 33% in power consumption at a frequency of 5 GHz as compared to the one not utilizing standing waves. In the circuit configuration described above, the line length was arranged so as to produce standing waves at a frequency of 5 GHz. As seen from FIG. 8, however, the effect of reducing power consumption was obtained at frequencies in the range of 4 and 6 GHz. This also shows that the power reduction effect can be obtained without the production of standing waves as long as the voltages in the middle of the wiring decrease under the influence of interference.

Figure 9:
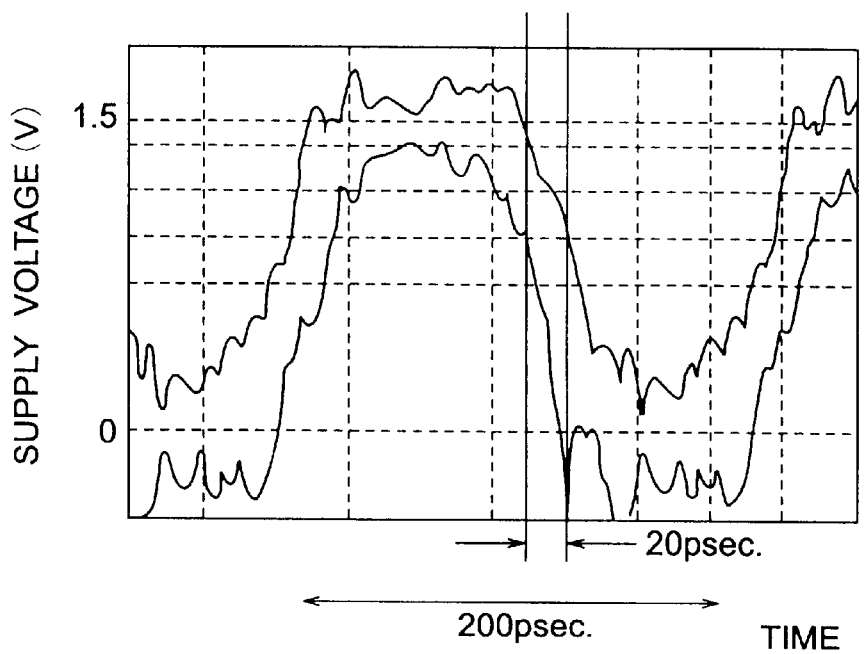
FIG. 9 is a graphic representation showing the relation between and the supply voltage.

FIG. 9 shows SPICE simulation results on clock skew in the clock distribution circuit according to the first embodiment. FIG. 9 is a graphic representation on which the abscissa represents the time and the ordinate represents the supply voltage, showing the relation between them. Here, FIG. 9 displays countless simulation results superposed, showing the clock waveforms at different points within a local block of the circuit under simulation. The clock distribution circuit was a 10-mm-square chip targeted at 0.1-$\mu$m CMOS. Sixteen 2.5-mm-square local blocks were formed at the chip.

As in FIG. 9, the simulation results show that a 5-GHz clock having a clock period of 200 pico-seconds was distributed with a skew of 20 pico-seconds. In other words, the clock skew was about 10% the clock frequency.

Figure 10:
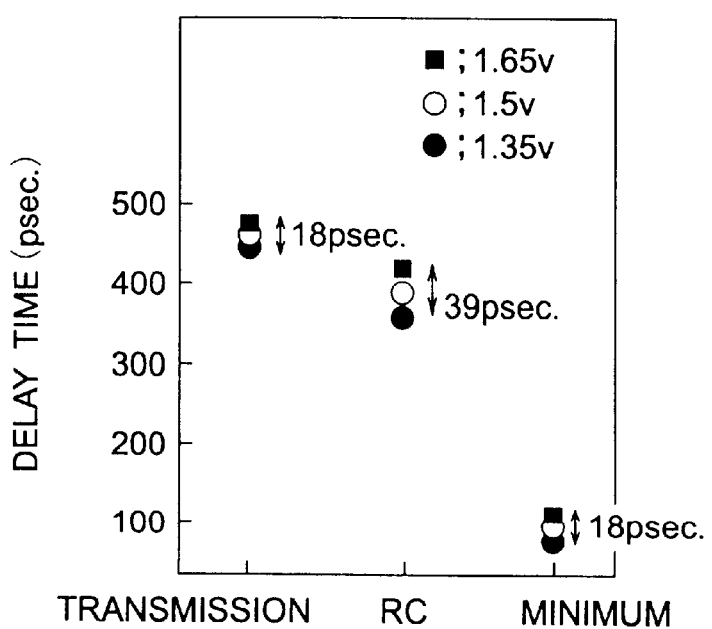
FIG. 10 is a graphic representation showing differences in delay time among various distribution circuits.

Next, FIG. 10 shows the effect of reducing device variations by the use of transmission lines. FIG. 10 is a graphic representation on which the abscissa represents the type of distribution circuits and the ordinate represents the delay time between input and output of a signal to/from a circuit, showing differences in delay time among various distribution circuits. Seen in FIG. 10 by SPICE simulation are delay time's variation dependencies on the transistor supply voltage in propagating a signal through a distribution circuit having 6 stages of inverters and 5 stages of lines. The simulation results shown in FIG. 10 are, in order from the left on the abscissa, of the circuit with clock wirings consisting of transmission lines, of that with clock wirings consisting of RC distributed constant circuits, and of that with lines having zero resistance and zero capacitance (minimum lines). In the transmission line circuit, its Al wirings were set to be 1.6 $\mu$m in height, 10 $\mu$m in width, 2 $\mu$m in interlayer thickness, 28 $\Omega$ in characteristic impedance, 2.38 k$\Omega$/m in wiring resistance, and 10 mm in wiring length. Its buffers had a channel length of 0.1 $\mu$m, a P-channel width of 260 $\mu$m, and an N-channel width of 160 $\mu$m. The RC distribution constant wirings were under the same conditions except in that the inductance was 0. The minimum lines were also under the same conditions except in that the resistance, capacitance, and inductance were 0. Simulations were run over each of the three types of wirings with transistor supply voltages of 1.35 V, 1.5 V, and 1.6 V. The resultant delay times were plotted in the figure.

As in FIG. 10, the simulation results show that the minimum lines produced a delay time variation of 18 pico-seconds in driving transistors, under the influence of the transistors' device variations. The RC distributed constant lines produced additional time variations in driving the wiring capacitances and wiring resistances under the influence of device variations of the transistors, resulting in a delay time variation as significantly large as 39 pico-seconds in comparison with that of the minimum lines. In contrast, when the transmission lines were used, the propagation delay time was determined depending on the velocity of electromagnetic waves and the propagated distance only. Therefore, the effect of the device variations caused the same difference in delay time as that produced in the minimum lines under the influence of the device variations of the transistors. In short, the use of transmission lines makes it possible to significantly reduce the effect of device variations as compared with the case where RC distributed constant lines are used.

Figure 11:
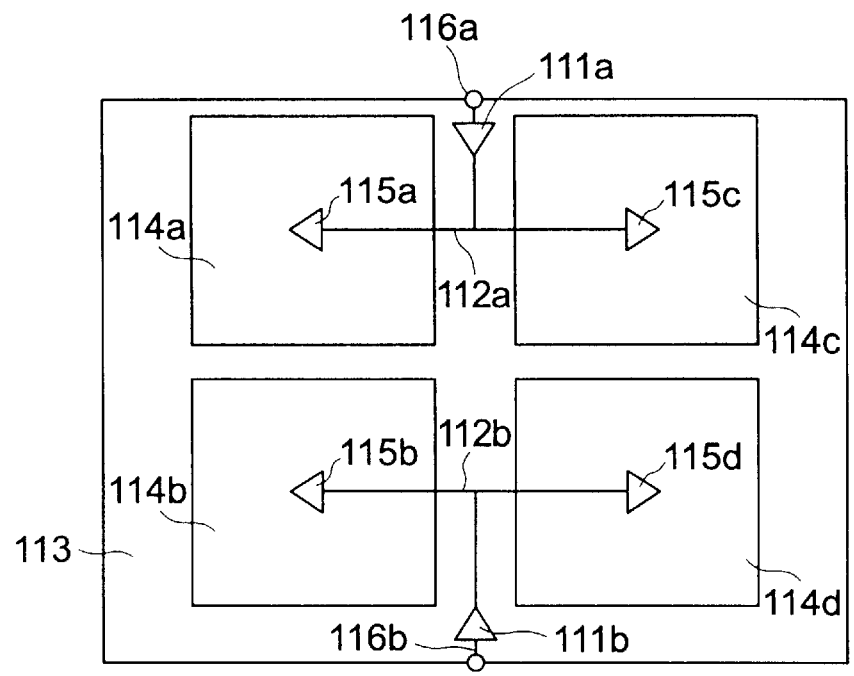
FIG. 11 is a schematic diagram showing the clock distribution circuit according to a second embodiment of the present invention.

Now, description will be given of a second embodiment of the present invention. FIG. 11 is a schematic diagram showing the clock distribution circuit according to a second embodiment of the present invention.

As in the first embodiment, the second embodiment of the present invention has a semiconductor chip 113 which is provided with a plurality of circuit terminals for clock reference. These circuit terminals are grouped into a plurality of blocks 114a through 114d. The blocks 114a–114d are provided with clock buffers 115a–115d at their centers, respectively. The buffers 115a–115d each serves as a second clock driver for driving a local clock in the block.

The semiconductor chip 113 is also provided with clock input terminals 116a and 116b through which clock signals are input. The clock input terminals 116a and 116b are connected with clock buffers 111a and 111b as first clock drivers, respectively. The clock buffers 111a and 111b are in turn connected with global clock wirings 112a and 112b consisting of transmission lines, respectively. The global clock wiring 112a branches out once to be connected with clock buffers 115a and 115c at its end portions. Similarly, the global clock wiring 112b branches out once to be connected with clock buffers 115b and 115d at its end portions. Here, all the wirings from the buffer 111a to each of the clock buffers 115a, 115c and from the buffer 111b to each of the clock buffers 115b, 115d have the same length. Each of the local blocks 114a–114d has the same configuration as that in the first embodiment.

In the second embodiment configured thus, a clock signal input through the clock input terminal 116a is distributed by the clock buffer 111a to each of the clock buffers 115a and 115c through the global clock wiring 112a consisting of transmission lines. Meanwhile, a clock signal input through the clock input 116b is distributed by the clock buffer 111b to each of the clock buffers 115b and 115d through the global clock wiring 112a consisting of transmission lines. Since the wirings between the buffers are identical in length, each of the clock buffers 115a–115d receives a clock in phase if the clock signals are identical in frequency.

Subsequently, the clock signals distributed to the clock buffers 115a–115d are in turn distributed by the clock buffers 115–115d to clock reference terminals provided in the blocks 114a–114d, respectively.

According to the second embodiment, even when a plurality of global clock wirings each for distributing a clock signal to a plurality of blocks exist independently, clock signals can be input to each global clock wiring through individual clock input terminals of the LSI. Here, two or more clocks among those to be input may have the same frequency and the same phase.

If, as in the first embodiment, a clock signal is input through a single clock input terminal and then distributed to the clock buffer in each block through a gigantic global clock wiring within the LSI, the global clock wiring is expected to be long, which may require the wiring to be expanded in width for the purpose of reducing the wiring resistance. The expanded wiring, however, causes a drop in characteristic impedance. As a result, the clock buffer connected to the input terminal needs to be lowered in output impedance with an increase in power consumption. According to the second embodiment, in contrast, an identical clock can be input through a plurality of input terminals to avoid such problem and improve both power efficiency and wiring efficiency.

In the second embodiment, the clock buffers 115a–115d are arranged at the centers of the blocks 114a–114d, respectively; however, their locations are not limited to the centers of blocks.

Figure 12:
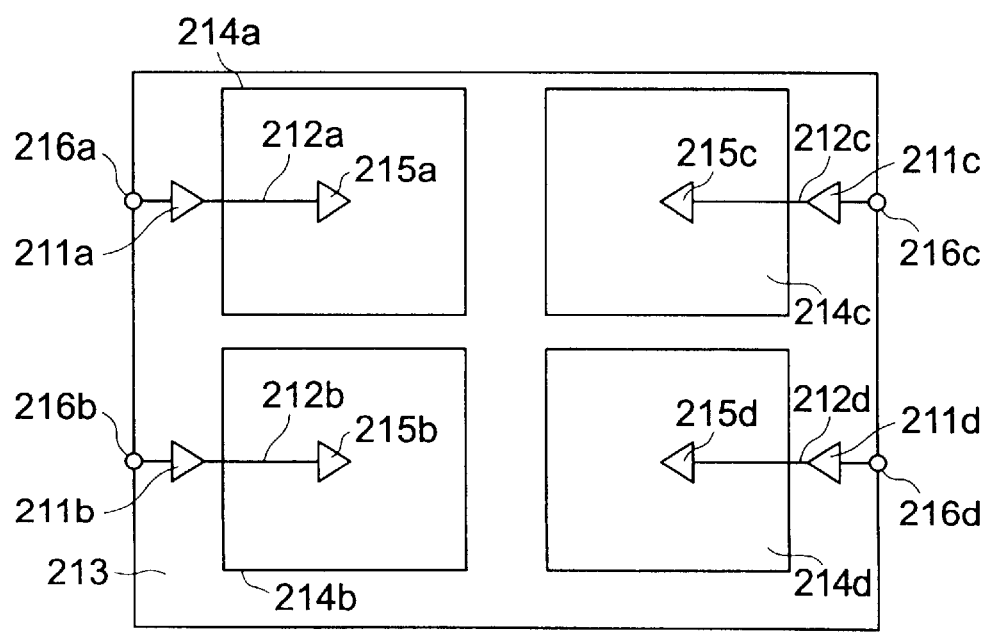
FIG. 12 is a schematic diagram showing the clock distribution circuit according to a third embodiment of the present invention.

Now, description will be given of a third embodiment of the present invention. FIG. 12 is a schematic diagram showing the clock distribution diagram according to a third embodiment of the present invention.

As in the first and second embodiments, the third embodiment of the present invention has a semiconductor chip 213 which is provided with a plurality of circuit terminals for clock reference. These circuit terminals are grouped into a plurality of blocks 214a through 214d. The blocks 214a–214d have at their centers clock buffers 215a–215d each for driving a local clock in the block, respectively.

The semiconductor chip 213 is also provided with clock input terminals 216a–216d through which clock signals are input. The clock input terminals 216a–216d are connected with clock buffers 211a–211d, respectively. The clock buffers 211a–211d in turn are connected with global clock wirings 212a–212d consisting of transmission lines, respectively. The global clock wirings 212a–212d are then connected with clock buffers 215a–215d at their ends, respectively. Here, the wirings from the buffers 211a–211d to the clock buffers 215a–215d, respectively, have the same length. The local blocks 214a–214d are of the same configuration as that in the first embodiment.

In the third embodiment configured thus, signals are driven directly from the clock input terminals 216a–216d to the clock buffers 215a–215d serving as local clock drivers, without any branch.

Considering the influence of device variations, it is desirable that the global clock wirings 212a–212d consist of transmission lines as already described. In view of the delay time problem, however, each global clock wiring may be constituted through estimation of its delay time by RC distribution constants.

In the third embodiment, the clock buffers 215a–215d are arranged at the centers of the blocks 214a–214d, respectively; however, their locations are not limited to the centers of blocks.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A clock distribution circuit comprising:
    a plurality of blocks each having a plurality of circuits;
    a first clock driver which distributes a clock signal to each of said blocks;
    second clock drivers each provided in one of said blocks, each distributing said clock signal to each of said circuits in the block;
    a first wiring connected between said first clock driver and each of said second clock drivers so that said clock signal arrives at each of said second clock drivers in the same phase; and
    a plurality of second wirings connected between said second clock drivers and each of said circuits in the block, said second wirings consisting of transmission lines, said second wirings having a maximum length equal to or smaller than a product of clock skew allowable and a propagation velocity of an electromagnetic wave propagating through said second wirings.

2. The clock distributing circuit according to claim 1, wherein said first wiring consists of a transmission line.

3. The clock distribution circuit according to claim 1, wherein said first wiring between said second clock drivers has a substantial length obtained by multiplying a wavelength obtained from a frequency of said clock signal by an integer multiple of ¼.

4. The clock distribution circuit according to claim 1, wherein each of said second wirings is formed to be smaller in width each time it branch out from the side of each of said second clock drivers.

5. The clock distribution circuit according to claim 1, wherein said first wiring is formed to be smaller in width each time it branches out from the side of said first clock driver.

6. The clock distribution circuit according to claim 1, wherein each of said second wirings is formed so high in wiring resistance that its ends can be approximated to RC distribution constant circuits.

7. A clock distribution circuit comprising:
    a plurality of blocks each having a plurality of circuits;
    a plurality of first clock drivers each of which supplies a clock signal to each of said blocks;
    second clock drivers each provided in one of said blocks, each distributing said clock signal to each of said circuits in the block;
    a plurality of first wirings connected between said first clock driver and said second clock driver in each of said blocks so that said clock signal arrives at said second clock drivers in the same phase; and
    a plurality of second wirings connected between said second clock drivers and each of said circuits in the block, said second wirings consisting of transmission lines, said second wirings having a maximum length equal to or smaller than a product of clock skew allowable and a propagation velocity of an electromagnetic wave propagating through said second wirings.

8. The clock distributing circuit according to claim 7, wherein said first wiring consists of a transmission line.

9. The clock distribution circuit according to claim 7, wherein said first wiring between said second clock drivers has a substantial length obtained by multiplying a wavelength obtained from a frequency of said clock signal by an integer multiple of ¼.

10. The clock distribution circuit according to claim 7, wherein each of said second wirings is formed to be smaller in width each time it branch out from the side of we each of said second clock drivers.

11. The clock distribution circuit according to claim 7, wherein said first wiring is formed to be smaller in width each time it branches out from the side of said first clock driver.

12. The clock distribution circuit according to claim 7, wherein each of said second wirings is formed so high in wiring resistance that its ends can be approximated to RC distribution constant circuits.

* * * * *